(12) United States Patent
Mimasa

(10) Patent No.: US 7,374,192 B2
(45) Date of Patent: May 20, 2008

(54) SYSTEM FOR ACCESSING COMPONENTS OF A POWER TRAIN OF A STRADDLE TYPE VEHICLE

(75) Inventor: Yoshiyasu Mimasa, Shizuoka-ken (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 412 days.

(21) Appl. No.: 11/281,879

(22) Filed: Nov. 17, 2005

(65) Prior Publication Data

US 2006/0119071 A1    Jun. 8, 2006

(30) Foreign Application Priority Data

Nov. 17, 2004    (JP)    ............... 2004-332849

(51) Int. Cl.
*B62J 25/00*    (2006.01)
(52) U.S. Cl. .................... 280/291; 280/163; 280/293; 180/210; 180/215; 180/216; 180/217
(58) Field of Classification Search ................ 280/291, 280/163, 293; 180/219, 210, 215, 216, 217
See application file for complete search history.

(56) References Cited

U.S. PATENT DOCUMENTS 3,506,284 A * 4/1970 Mennesson ............... 280/288.3
6,270,106 B1 * 8/2001 Maki et al. ................. 280/291
6,588,529 B2 * 7/2003 Ishii et al. .................. 180/219
6,644,693 B2 * 11/2003 Michisaka et al. .......... 280/835
6,655,705 B2 * 12/2003 Turgeon ..................... 280/163
6,920,950 B2 * 7/2005 Sonoda ...................... 180/98.3
2006/0249924 A1 * 11/2006 Armstrong et al. ......... 280/163

FOREIGN PATENT DOCUMENTS

JP    Y-HEI7-002384    1/1995

* cited by examiner

*Primary Examiner*—Lesley D. Morris
*Assistant Examiner*—Marlon Arce-Diaz
(74) *Attorney, Agent, or Firm*—Knobbe, Martens, Olson & Bear, LLP

(57) ABSTRACT

A system is provided that permits access to one or more components of the power train of a straddle type vehicle (or another internal component or components) without requiring such component to protrude from the body cover of the vehicle. The system can comprise a foot area that includes a foot platform for placing one's feet, an opening positioned above at least the component of the power train, and a cover for permitting the opening to be opened and closed. This system, for example, allows a user to access the oil filler port of the engine via the opening in the foot area in order to add oil to the engine of the vehicle. The system can also include a foot platform comprising a first level and a second level where the second level is located at a higher elevation relative to the first level.

25 Claims, 8 Drawing Sheets

SYSTEM FOR ACCESSING COMPONENTS OF A POWER TRAIN OF A STRADDLE TYPE VEHICLE

CROSS-REFERENCE TO RELATED APPLICATIONS

This application is based on and claims priority under 35 U.S.C. § 119(a)-(d) to Japanese Patent Application No. 2004-332849, filed Nov. 17, 2004, the entire content of which is hereby incorporated by reference.

BACKGROUND OF THE INVENTION

1. Field of the Invention

The present invention relates to straddle type vehicles in general and, in particular, to a straddle type vehicle having a foot area that permits access to components of the power train of the vehicle.

2. Description of the Related Art

In order to maximize the operational life of a straddle type vehicle, the mechanical components of the vehicle must be properly maintained. Proper maintenance is particularly important for components of the power train of the straddle type vehicle since the power train is a mechanism which propels the vehicle. Without proper maintenance of the power train, the straddle type vehicle may not function properly and the useful life of the straddle type vehicle may be significantly shortened.

Components of the power train of a straddle type vehicle are typically covered by the body cover of the vehicle. As a result, access to such components can often be obstructed by the vehicle body cover and other components of the straddle type vehicle. Such obstruction makes accessing components of the power train difficult and time consuming since the vehicle body cover may have to be removed in order to access particular components of the power train of a straddle type vehicle. One component of the power train that is particularly important is the lubricant filler port which is often located near the engine. Lubricant (e.g., oil) should be regularly added to the vehicle in order for mechanical components of the power train to be properly lubricated so that the vehicle is capable of operating at maximum effectiveness. As a result, an owner of a straddle type vehicle typically needs access to the filler port in order to add oil to the vehicle at least monthly and in some cases weekly.

Some prior straddle type vehicles have positioned the oil filler port in the rear of the straddle type vehicle so that the oil filler port protrudes from the vehicle body cover. This configuration allows an owner to add oil more easily to their straddle type vehicle since the oil filler port can be accessed without removing the vehicle body cover. However, this configuration is disliked by many vehicle owners because the oil filler port protrudes from the vehicle body cover and is conspicuously noticeable on the outside of the straddle type vehicle.

SUMMARY OF THE INVENTION

Since many owners of straddle type vehicles are particularly concerned with the aesthetic appearance of their vehicle, the inventors of the present accessing system recognized the need for a system that permits easy access to components of the power train without having such components protrude from the vehicle. In addition, the inventors also recognized that the accessing system should provide an integrated cover concealing an opening in the vehicle body cover so that components of the power train can be accessed by opening the cover for maintenance purposes and the cover can be closed or otherwise repositioned when access to components of the power train is not necessary, such as when the vehicle is in operation.

Accordingly, one aspect of the present invention involves a straddle type vehicle comprising at least one wheel rotatable about a generally horizontal axis and a vehicle body supported in part by the wheel. A power train includes an engine and a vehicle body cover encloses at least a portion of the power train. The vehicle body cover forms at least one foot area, at least a portion of which is disposed above at least part of the power train. In addition, the foot area comprises a foot platform, an opening, and a cover. The foot platform provides a location on which a rider can place his or her foot while straddling the vehicle. The opening is located above at least one internal component of the straddle type vehicle. The cover permits the opening in the foot area to open and close at the discretion of a user of the straddle type vehicle.

In a preferred mode, the cover has a rear slant portion that extends upward at an angle relative to the horizontal axis towards a rear portion of the straddle type vehicle. In another preferred mode, the vehicle includes a detachable foot mat that is capable of being placed over the cover such that it substantially integrates with the foot platform. The detachable foot mat provides a mechanism to conceal both the opening and the cover in the foot area so that the outside of the straddle type vehicle does not expose components of the power train of the straddle type vehicle. In yet another preferred mode of this aspect of the invention, the vehicle includes a support frame for supporting the foot area. The support frame is configured so that the opening in the foot area is spaced apart from the support frame. Such configuration permits the foot area to be properly supported while at the same time allowing access to components of the power train of the vehicle via the opening in the foot area.

In another preferred mode, the engine of the vehicle includes an oil filler port that provides oil to components of the engine. In one preferred mode, the vehicle also includes a cylindrical portion extending upward from the engine in the direction of the foot area. In another preferred mode, the oil filler port mentioned above is located at a terminal end of the cylindrical portion of the engine so that the oil filler port extends in the general direction of the foot area. In yet another preferred mode, the cylindrical portion containing the oil filler port on its terminal end extends obliquely upward from the engine in the general direction of the opening in the foot area of the straddle type vehicle. Such configuration provides an oil filler port located substantially near the opening in the foot area so that a user can easily access the oil filler port of the engine when desired.

In accordance with another aspect of the present invention, a straddle type vehicle is provided having at least one wheel rotatable about a generally horizontal axis. The vehicle also includes a vehicle body supported in part by the wheel and a power train including an engine. A vehicle body cover encloses at least a portion of the power train, and forms a foot area such that the foot area is positioned above at least a portion of the power train of the vehicle. The foot area comprises a foot platform including both a first level and a second level. The foot area also comprises an opening and a cover. The second level of the foot platform is positioned at a higher elevation than the first level relative to a generally horizontal plane. The opening in the foot area is located on the second level of the foot platform, which is disposed above at least a component of the power train of the vehicle. Likewise, the cover is located on the second level of the foot platform and the cover allows the opening in the foot area to open and close at the discretion of a user of the straddle type vehicle.

In a preferred mode of this aspect of the invention, the first level of the foot platform is generally configured to allow the operator of the straddle type vehicle to place their feet on the foot platform when straddling the vehicle. While the second level of the foot platform is generally configured to allow a rear seat passenger of the straddle type vehicle to place their feet on the foot platform when straddling a rear seat of the straddle type vehicle. The elevation of the second level of the foot platform relative to the first level of the foot platform generally corresponds with the elevation of a rear seat relative to a front seat of the straddle type vehicle. This configuration permits a rear seat passenger to comfortably place his or her foot on the second level of the foot platform. In a preferred mode, a detachable foot mat is positioned on the second level of the foot platform and is configured to be substantially integrate with the foot platform.

In another preferred mode, the engine of the vehicle includes an oil filler port that provides oil to components of the engine. In one preferred mode, the vehicle also includes a cylindrical portion extending upward from the engine in the direction of the foot area. In another preferred mode, the oil filler port mentioned above is located at a terminal end of the cylindrical portion of the engine so that the oil filler port extends in the general direction of the foot area. In yet another preferred mode, the cylindrical portion containing the oil filler port on its terminal end extends obliquely upward from the engine in the general direction of the opening on the second level of the foot area of the straddle type vehicle. Such configuration provides an oil filler port located substantially near the opening on the second level of the foot area so that a user can easily access the oil filler port of the engine when desired.

An additional aspect of the present invention involves a straddle type vehicle having at least one wheel that rotates about a generally horizontal axis. The vehicle also includes a vehicle body, a power train including an engine disposed at least partially within the vehicle body, and a vehicle body cover. The vehicle body cover encloses at least a portion of the power train of the vehicle. A seat is at least partially attached to the top of the vehicle body cover. The vehicle body cover forms a first foot area located on the left side of the vehicle body, and a second foot area located on the right side of the vehicle body. At least one of the foot areas includes an opening and a cover. The opening is located above at least one internal component of the straddle type vehicle. The cover permits the opening in the foot area to open and close at the discretion of a user of the straddle type vehicle.

BRIEF DESCRIPTION OF THE DRAWINGS

These and other features, aspects, and advantages of the present invention will now be described in connection with preferred embodiments of the invention, in reference to the accompanying drawings. The illustrated embodiments, however, are merely examples and are not intended to limit the invention. The drawings include the following eight figures.

FIG. 5(*b*) is a perspective view of a foot area of FIG. 5(*a*) showing a cover in the foot area in a closed position and the detachable foot mat removed.

FIG. 5(*c*) is a perspective view of a foot area of FIG. 5(*b*) showing the cover removed from the foot area to expose one or more of the power train components.

DETAILED DESCRIPTION OF THE PREFERRED EMBODIMENT

Figure 1:
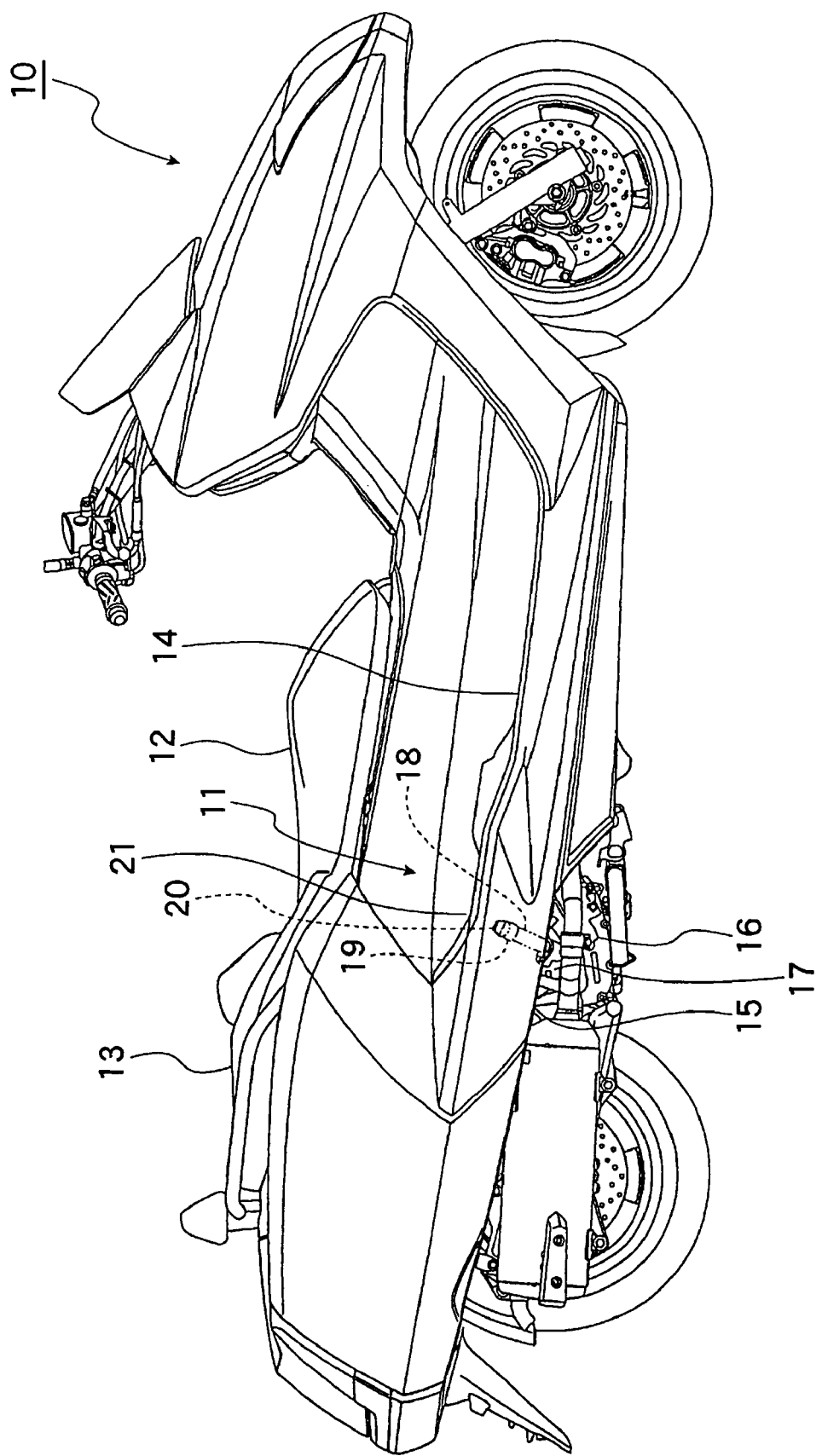
FIG. 1 is a side elevational view of a straddle type vehicle including a system for accessing components of a power train of the straddle type vehicle configured in accordance with a preferred embodiment of the present invention.

A system for accessing components of a power train is illustrated in the drawings and is described below in the context of an application with a straddle type vehicle. However, the system for accessing components of a power train can be used with other types of vehicles. Preferably, the system can be used with vehicles which have a wheel rotatable about a generally horizontal axis, a steering column, a steering mechanism coupled to the top of the steering column, and a straddle type seat located substantially near the steering column. For example, such vehicles in which a the system described herein can be employed include, but are not limited to, a motorcycle, a scooter, and a multi-terrain vehicle. Accordingly, the below description and the drawings describe a motorized scooter; however, the present accessing system can be used on other types of straddle type vehicles as well.

Before describing the system for accessing components of a power train, the construction of the motor scooter will first be described in connection with FIG. 1. In FIG. 1, the reference numeral 10 indicates a motor scooter.

A vehicle body cover 11 covers the periphery of a vehicle body. In the illustrated embodiment, the motor scooter 10 has a front seat 12 and a rear seat 13. However, in another embodiment, the vehicle 10 might have only a single seat. On both lateral sides of the vehicle body cover 11, a pair of foot areas 14 extend so that riders sitting on the seats 12, 13 can put their feet thereon. The foot areas 14 can comprise a first foot area and a second foot area. The first foot area preferably is formed in the vehicle body cover and is located on the left side of the motor scooter 10. The second foot area preferably is formed in the vehicle body cover and is located on the right side of the motor scooter 10.

In one embodiment, the motor scooter 10 has a power train which includes at least an engine 16. The power train operates so as to transmit power generated by components of the vehicle to at least one wheel of the vehicle. Such power generated in the power train is transmitted to rotational power and enables the motor scooter 10 to move. As a result, the vehicle 10 operates to transport a rider from one location to another location.

As shown in FIG. 1, the vehicle body cover 11 has a bottom end 15 corresponding to a lower portion of the vehicle body. The vehicle body cover 11 extends to a location lower than an engine 16 so as to cover a lateral side of a tubular member 18 which protrudes upward from the engine 16 and oil is poured. A top end of the tubular member 18 has an oil filler port 19. A cap 20 is detachably fixed to the oil filler port 19. The oil filler port 19 is positioned at a location adjacent to a bottom surface of a foot platform 21 which is a rear portion of the foot area 14. In the illustrated embodiment, the foot platform 21 is configured so that the rider on the rear seat 13 can place their feet on the foot platform 21 while the motor scooter 10 is in operation.

The foot platform 21 preferably comprises a first level and a second level; however, the platform can be flat, slanted or formed by multiple steps or levels. In the illustrated embodiment, the second level is generally at a higher elevation than the first level of the foot platform 21. As a result, the first level is generally a foot rest portion for the rider in the front seat of the vehicle while the second level is generally a foot rest portion for the rider in the rear seat. The foot platform 21 preferably has an opening 22 through which the oil filler port 19 is exposed and accessible from outside the body cover 11, and a cover 23 for closing the opening 22. The cover 23 can be either detachable fixed to the foot platform (as described below) or can be otherwise attached (e.g., by one or more hinges). A detachable foot mat 24 detachably extends over the cover 23. Preferably, the detachable foot mat 24 has a sufficient size for covering the cover 23.

The opening is not limited to accessing the oil filler port 19. Other components of the power train may be disposed such that the opening 22 provides access to such components of the power train. For example, in certain embodiments, the opening 22 may provide access to components of the engine 16 or alternative filling ports for fluids other than oil. Additionally, other components of the vehicle not associated with the power train (for example, window washing fluid or fuses for auxiliary components) can be disposed near and accessible through the opening.

Figure 4:
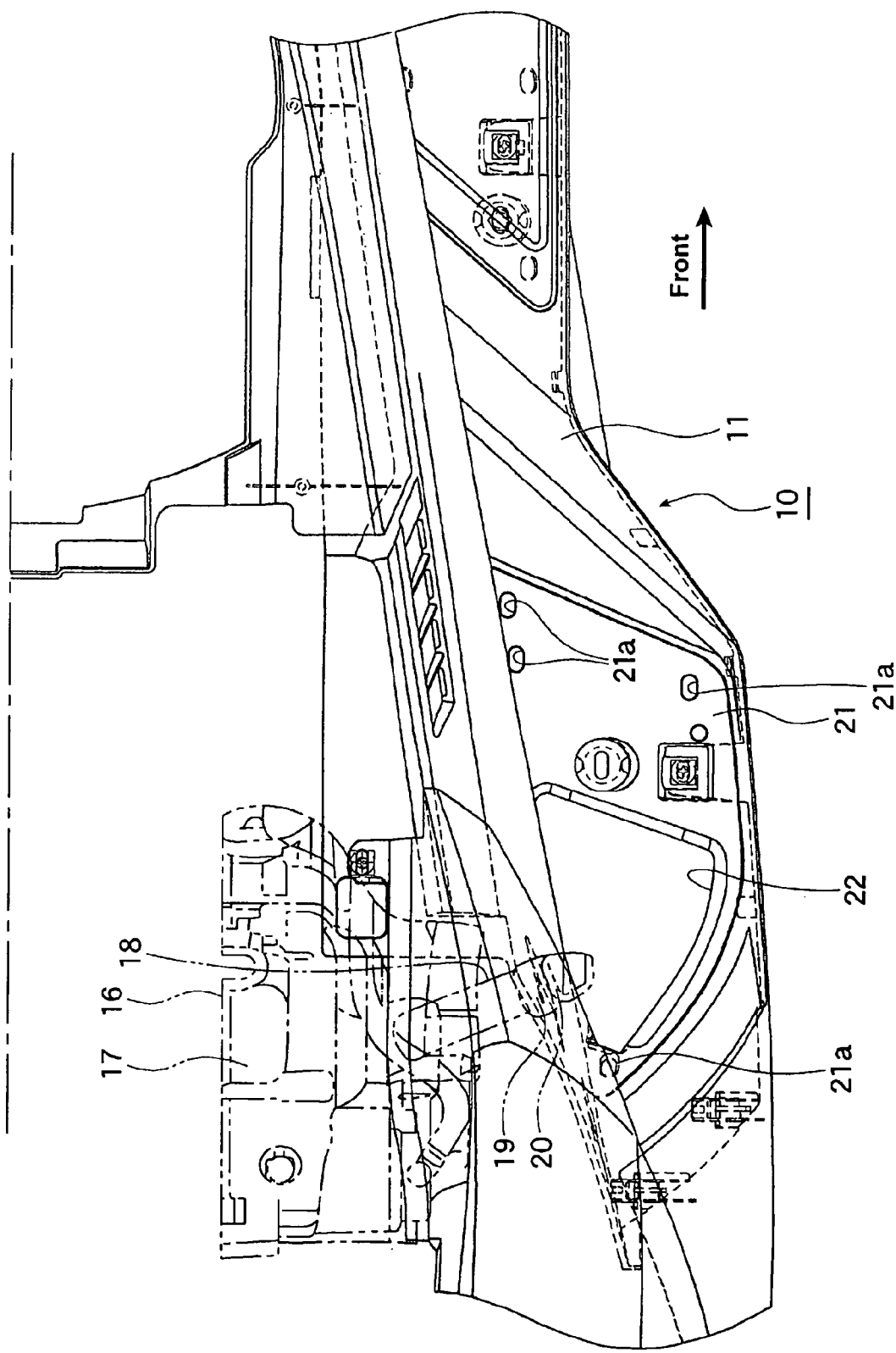
FIG. 4 is an enlarged top plan view of a foot area and components of a power train, similar to FIG. 3, with a cover, in addition to the detachable foot mat, being detached from the foot area.
Figures 5A, 5B, 5C:
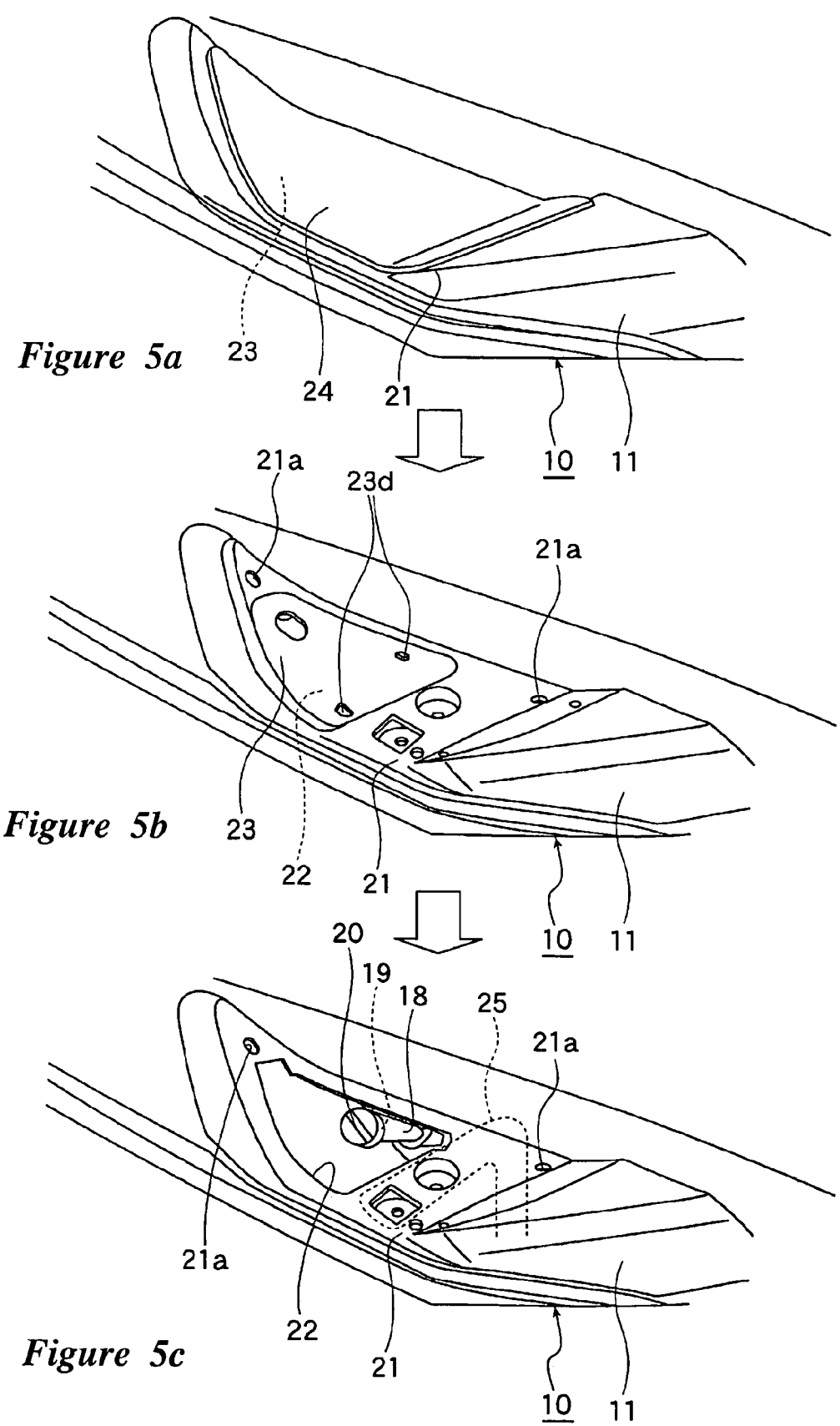
FIG. 5(*a*) is a perspective view of a foot area showing a detachable foot mat attached to a foot platform of the foot area of the straddle type vehicle as shown in FIG. 1.
Figure 6:
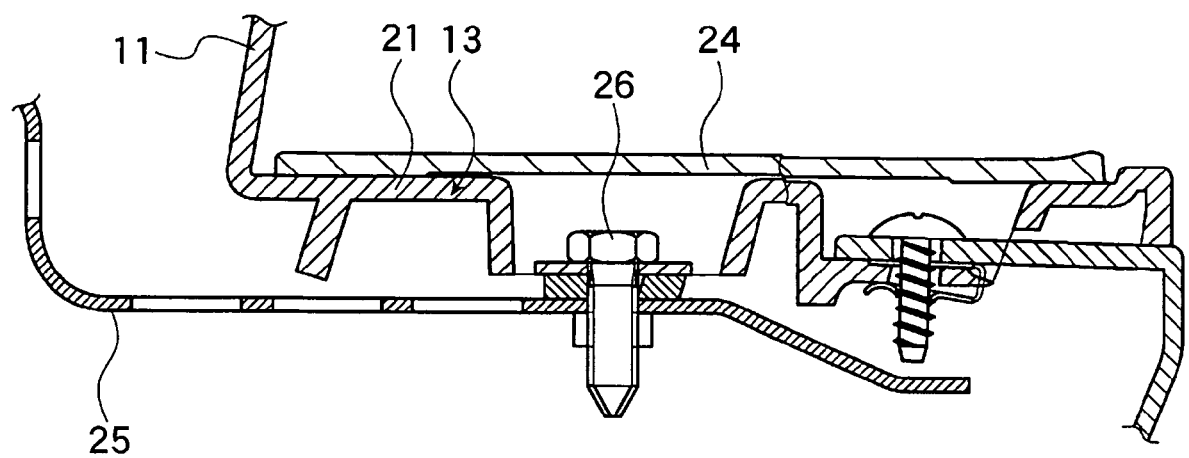
FIG. 6 is a cross-sectional view of the straddle type vehicle taken along line A-A as shown in FIG. 2.

As shown in FIGS. 4 and 5(*c*), in the illustrated embodiment, the opening 22 has a generally triangular shape. However, the opening 22 may comprise a variety of other shapes including, but not limited to, a square, rectangle, oval, or circle. The opening 22 is defined at a location spaced apart (rearward) from a support frame 25 supporting the foot platform 21. As shown in FIG. 6, the foot platform 21 is fixed to the support frame 25 by a screw 26.

In the embodiment, the cover 23 generally has a generally triangular shape 22 that is slightly larger than the opening 22 and detachably extends to cover the opening. However, the cover 23 can comprise a variety of other shapes including, but not limited to, a square, rectangle, oval, or circle. Preferably, the cover 23 is configured in a substantially similar shape as the opening 22 so that the cover 23 will fit suitably over the opening 22.

Figure 3:
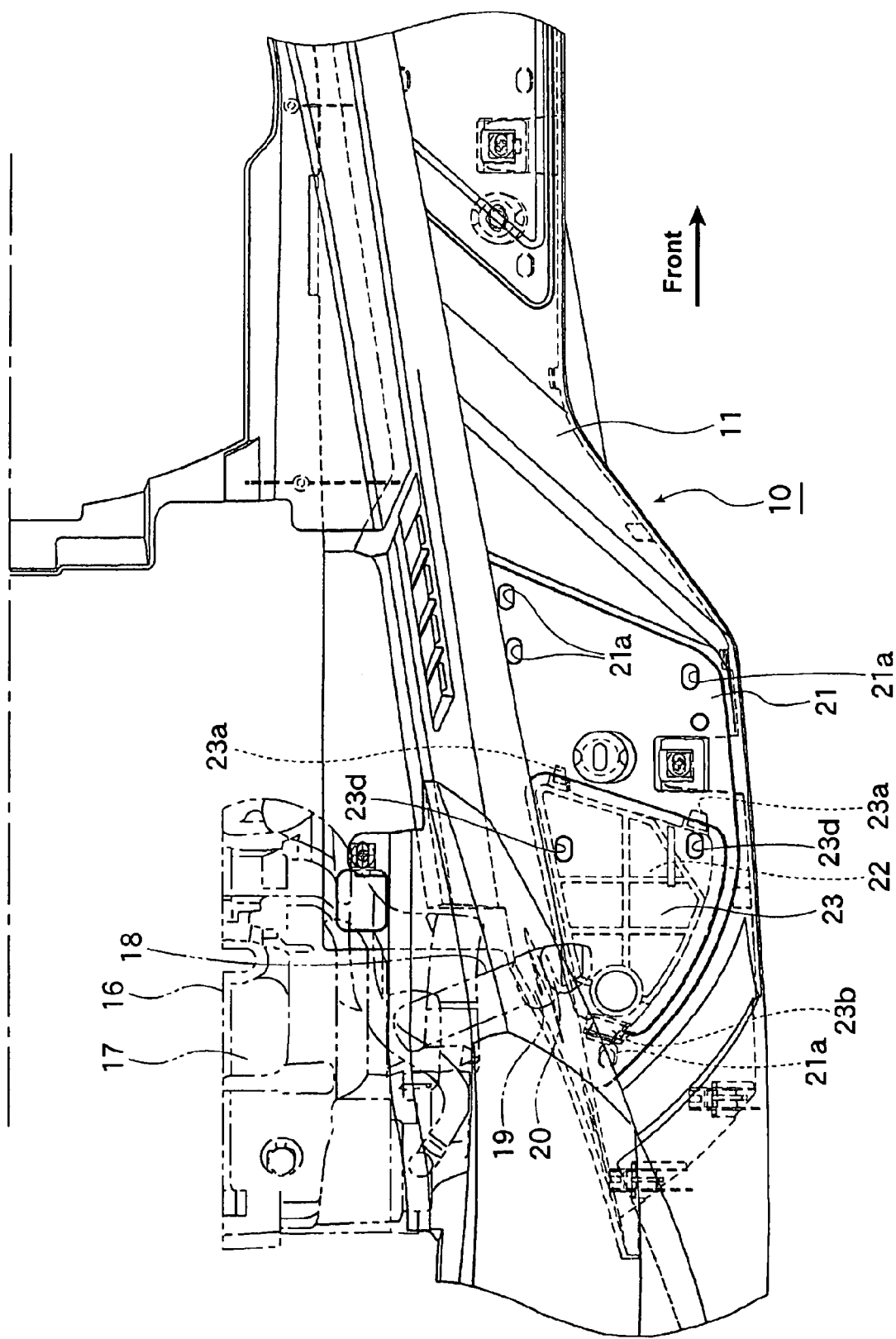
FIG. 3 is an enlarged top plan view of a foot area and components of a power train, similar to FIG. 2, with the detachable foot mat being detached from the foot area.
Figure 7:
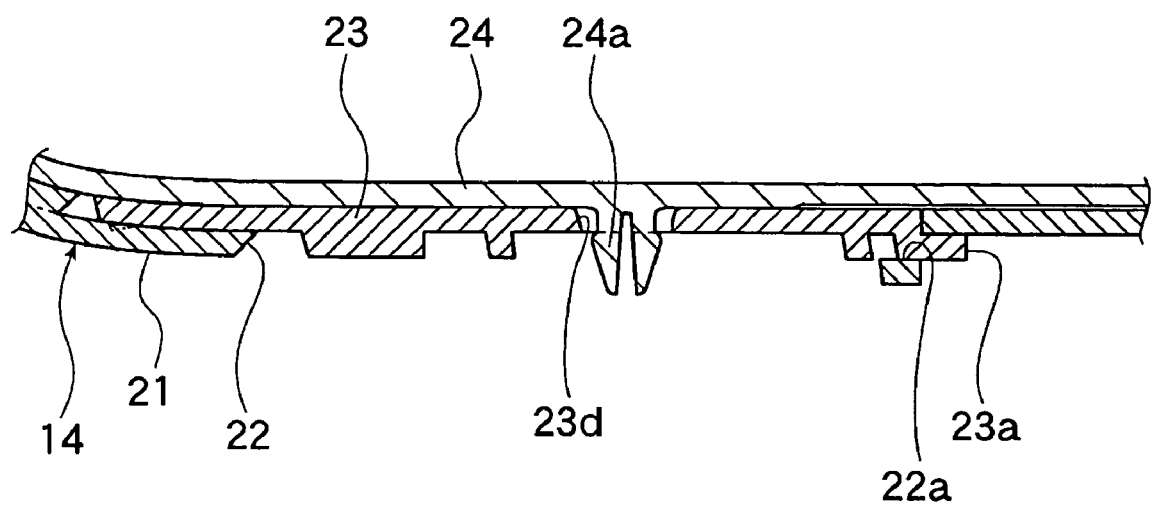
FIG. 7 is a cross-sectional view of the straddle type vehicle taken along line B-B as shown in FIG. 2.
Figure 8:
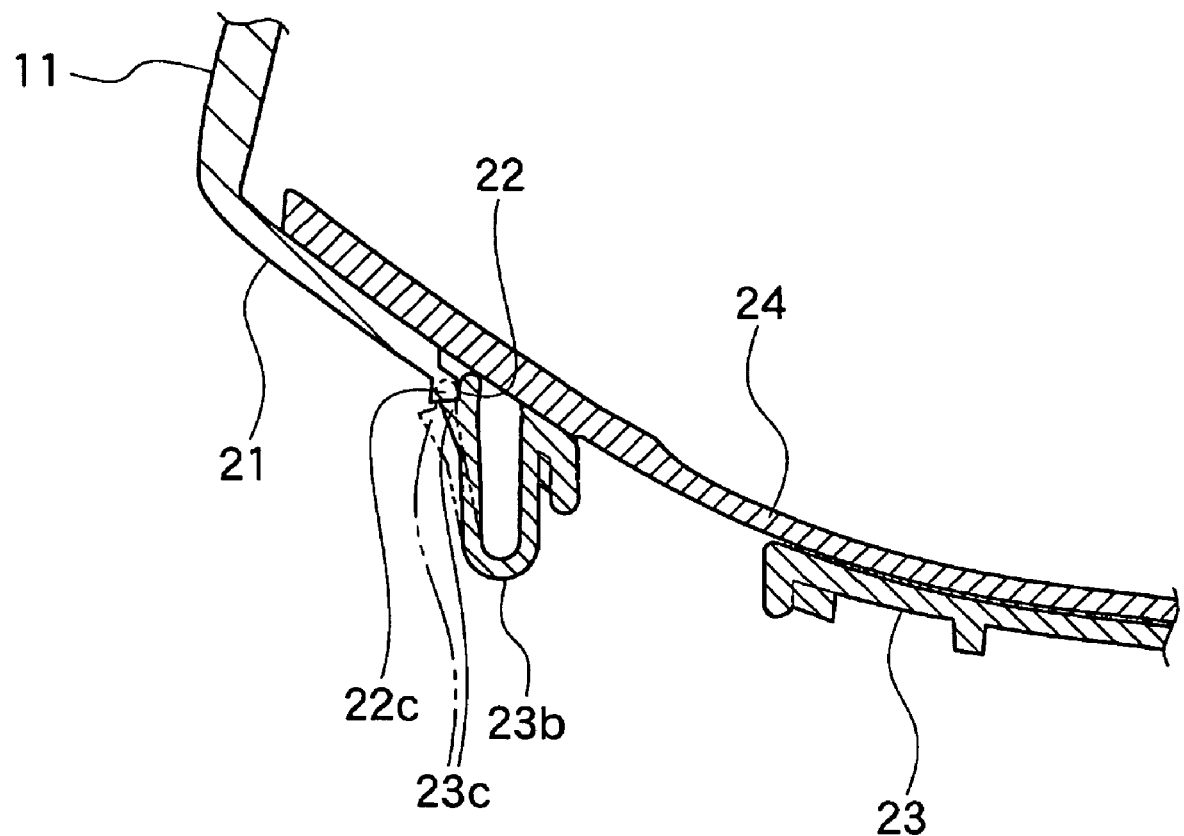
FIG. 8 is a cross-sectional view of the straddle type vehicle taken along line C-C as shown in FIG. 2.

As shown in FIGS. 3 and 7, a front end of the cover 23 preferably has a pair of insertion pieces 23*a*. The insertion pieces 23*a* are inserted into respective slits 22*a* formed at a circumferential portion of the opening 22 so as to be locked. As shown in FIGS. 3 and 8, a rear end of the cover 23 has an elastic engaging piece 23*b* which projects downward and generally has a U shape. A tip of the elastic engaging piece 23*b* has an engaging cut 23*c*. The circumferential portion of the opening 22 has an engaging portion 22*c*. The engaging cut 23*c* engages with the engaging portion 22*c* by its elastic force so that the cover 23 is attached. Under a condition that the cover 23 is attached, i.e., the cover 23 closes the opening 22, the cover 23 has a slant portion extending obliquely upward rearward toward a rear portion of the vehicle body.

When the cover 23 is detached, the elastic engaging piece 23*b* is elastically deformed to separate the engaging cut 23*c* from the engaging portion 22*c*. Under the condition, a rear end portion of the cover 23 is lifted so that the cover 23 slants. Then, the insertion pieces 23*a* are pulled out from the slits 22*a*. The cover 23 thus can be removed.

When the cover 23 is attached, the insertion pieces 23*a* of the cover 23 are inserted into the slits 22*a*, and the cover 23 is pivotally moved downward generally about the inserted portions. The elastic engaging piece 23*b* is elastically deformed so that the engaging cut 23*c* engages with the engaging portion 22*c*.

Figure 2:
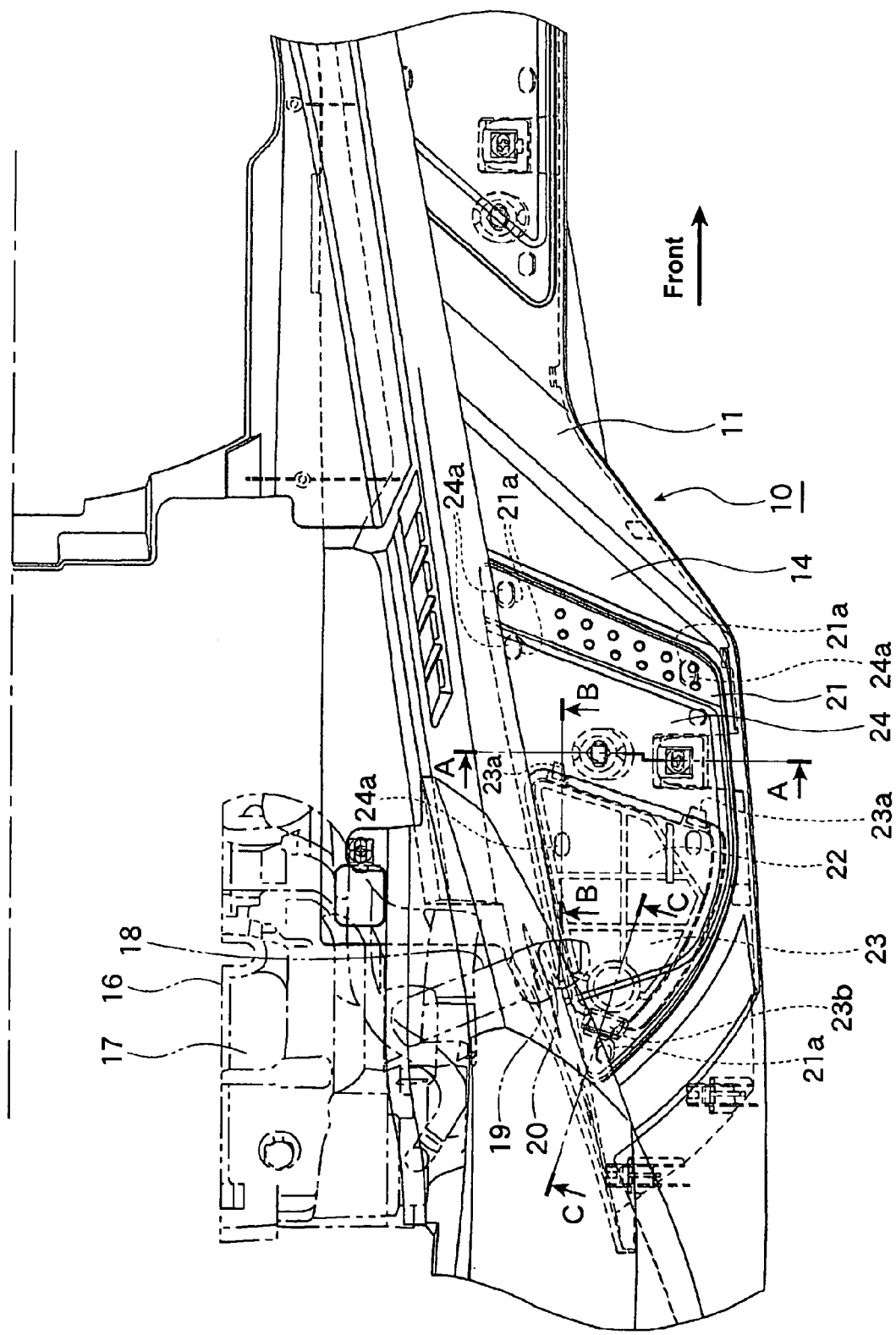
FIG. 2 is an enlarged, top plan view of a foot area of the straddle type vehicle of FIG. 1. The figure illustrates components of a power train in phantom lines and also illustrates a detachable foot mat being attached to the straddle type vehicle in a manner covering at least some of the components of the power train.

The detachable foot mat 24 is preferably made of a rubber material. However, the detachable foot mat 24 may be comprised of a variety of other materials including, but not limited to, plastic, metal, or a composite material. As shown in FIGS. 2 and 5, in one embodiment, the detachable foot mat 24 has a sufficient size to generally cover the whole area of the foot platform 21. In addition, as shown in FIGS. 2 and 5, the detachable foot mat 24 has a plurality of fit-in projections 24*a* as shown in FIG. 7. The fit-in projections 24*a* are detachably fitted into fit-in apertures 23*d* of the cover 23 and fit-in apertures 21*a* of the foot platform 21. In addition, the tubular member 18 obliquely extends upward toward the opening 22 of the foot platform 21.

With reference to the structure of the motor scooter 10 described above, situations will be described below including a situation in which the oil is poured through the oil filler port 19. First, the respective fit-in projections 24*a* of the detachable foot mat 24 are removed from the fit-in apertures 23*d*, 21*a* of the cover 23 and the foot platform 21 so as to detach the detachable foot mat 24. Next, the elastic engaging piece 23*b* of the cover 23 is elastically deformed so that the engaging cut 23*c* leaves from the engaging portion 22*c*. Then, the insertion pieces 23*a* are pulled out from the slits 22*a*. The cover 23 thus is detached to uncover the opening 22.

As described, the detachable foot mat 24 and the cover 23 are easily removed. Under this condition, as shown in FIGS. 4 and 5(*c*), the cap 20 of the oil filler port 19 is exposed outside through the opening 22. Thus, an operator can remove the cap 20 to pour oil or to perform maintenance work. When the pouring of oil or other work is completed, the opening 22 is closed by the cover 23, and the detachable foot mat 24 is placed on the cover 23 so as to conceal the cover 23 and to substantially integrate the foot platform 21 with the vehicle body cover.

In the illustrated embodiment, the foot platform 21 has the opening 22 through which the oil filler port 19, or other component of the power train of the vehicle, is exposed to the outside of the vehicle, and the cover 23 can open or close the opening 22. Thus, oil can be poured through the oil filler port 19, and an oil amount, degree of dirtiness of the oil, etc. can be confirmed or inspected through the opening 22 by opening the cover 23, even though the bottom end 15 of the vehicle body cover 11 is lowered to keep the lateral side surface of the tubular member 18 therein.

In addition, because the cover 23 is attached to the foot platform 21, the structure can assure good external appearance more than other structures in which the cover 23 is attached to other portions. That is, even though the foot platform 21 has the cover 23, which is a separate member, the cover 23 can set the vehicle body off as emphasizing that it is the foot area portion. Therefore, the external appearance of this structure is improved as compared to a structure in which the cover, which is the separate member, is attached to the vehicle body cover 11. The cover 23 also can be a mark of the oil filler port 19. Advantageously, the workability for pouring oil or the like can be performed satisfactorily since the cover 23 can be attached or detached in such a simple action.

One benefit of a preferred embodiment of the present system is that the cover 23 in the closing position of the opening 22 has a slant portion extending obliquely upward rearward toward a rear portion of a vehicle body. The cover 23 thus can block the foot of the rider in the rear seat from excessively moving rearward.

Advantageously, the detachable foot mat 24 having a sufficient size for covering the cover 23 detachably extends over the cover 23 for safeguard or the like. The external appearance of the motor scooter 10 thus can be improved.

The support frame 25 supports the foot platform 21 because a large load of the rider in the rear seat affects the foot platform 21. The opening 22, however, is spaced apart from the support frame 25. Thus, the load of the rider in the rear seat does not affect the opening 22. Accordingly, rigidity of the circumferential portion of the opening 22 can be assured.

Advantageously, the tip portion of the tubular member 18 extending upward from the crankcase 17 has the oil filler port 19 positioned adjacent to the opening 22. The oil pouring work or the like made from the oil filler port 19 through the opening 22 thus can be easier. In addition, because the tubular member 18 obliquely extends upward toward the opening 22 of the foot platform 21, the workability of the oil pouring work can be improved.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A straddle type vehicle comprising:
   at least one wheel rotatable about a generally horizontal axis;
   a vehicle body supported at least in part by the wheel;
   a power train including an engine;
   a vehicle body cover extending over at least a portion of the power train;
   a foot area formed in the vehicle body cover, the foot area being positioned above at least a portion of the power train, the foot area including a foot platform configured to provide a location for a rider's foot while straddling the vehicle;
   an opening in the foot area that is disposed above at least a component of the power train; and
   a cover in the foot area allowing the opening in the foot area to open and close.

2. The straddle type vehicle of claim 1, wherein the vehicle body defines another foot area, and the foot areas are disposed on opposite sides of the vehicle body relative to each other.

3. The straddle type vehicle of claim 2 additionally comprising an elevated pedestal disposed between the foot areas, and a seat disposed atop at least a portion of the elevated pedestal, the opening in said foot area being disposed beside the elevated portion.

4. The straddle type vehicle of claim 1, wherein the cover has a rear slant portion extending obliquely upward towards a rear portion of the vehicle body.

5. The straddle type vehicle of claim 1, further comprising a detachable foot detachable foot mat for concealing the cover and configured to substantially integrate with the foot platform.

6. The straddle type vehicle of claim 1, further comprising a support frame for supporting the foot area wherein the opening in the foot area is spaced apart from the support frame.

7. The straddle type vehicle of claim 1, wherein the engine comprises an oil filler port for providing oil to components of the engine.

8. The straddle type vehicle of claim 7, further comprising a cylindrical portion extending upward from the engine generally in the direction of the foot area.

9. The straddle type vehicle of claim 8, wherein the oil filler port is disposed at a terminal end of the cylindrical portion of the engine.

10. The straddle type vehicle of claim 9, wherein the cylindrical portion extends obliquely upward from the engine generally in the direction of the opening in the foot area.

11. A straddle type vehicle comprising:
   at least one wheel rotatable about a generally horizontal axis;
   a vehicle body;
   a power train including an engine;
   a vehicle body cover for covering at least a portion of the power train;
   a foot area formed in the vehicle body cover, the foot area being positioned above at least a portion of the power train;
   a foot platform in the foot area for providing a location to place one's feet while straddling the vehicle comprising a first level and a second level, wherein the second level is positioned at a higher elevation than the first level relative to a plane containing an axis generally parallel to the horizontal axis;
   an opening in the foot area located on the second level of the foot platform, wherein the opening is disposed above at least a component of the power train; and
   a cover in the foot area located on the second level of the foot platform, wherein the cover allows the opening in the foot area to open and close.

12. The straddle type vehicle of claim 11, wherein the vehicle body defines another foot area, and the foot areas are disposed on opposite sides of the vehicle body relative to each other.

13. The straddle type vehicle of claim 12 additionally comprising an elevated pedestal disposed between the foot areas, and a seat disposed atop at least a portion of the elevated pedestal, the opening in said foot area being disposed beside the elevated portion.

14. The straddle type vehicle of claim 11, wherein, as measured in a direction parallel to the horizontal axis, the second level is wider than the first level.

15. The straddle type vehicle of claim 11, wherein the cover has a rear slant portion extending obliquely upward towards a rear portion of the vehicle body.

16. The straddle type vehicle of claim 11, further comprising a detachable foot detachable foot mat located on the second level of the foot platform, wherein the detachable foot detachable foot mat is configured to conceal the cover and is configured to substantially integrate with the foot platform.

17. The straddle type vehicle of claim 11, further comprising a support frame for supporting the foot area wherein the opening on the second level of the foot area is spaced apart from the support frame.

18. The straddle type vehicle of claim 11, further comprising an engine having an oil filler port for providing oil to components of the engine.

19. The straddle type vehicle of claim 18, further comprising a cylindrical portion extending upward from the engine generally in the direction of the foot area.

20. The straddle type vehicle of claim 19, wherein the oil filler port is disposed at a terminal end of the cylindrical portion of the engine.

21. The straddle type vehicle of claim 20, wherein the cylindrical portion extends obliquely upward from the engine generally in the direction of the opening on the second level of the foot area.

22. A straddle type vehicle comprising:
at least one wheel rotatable about a generally horizontal axis;
a vehicle body;
a power train including an engine disposed at least partially within the vehicle body;
a vehicle body cover for covering at least a portion of the power train;
a seat at least partially attached to the top of the vehicle body cover;
a first foot area formed in the vehicle body cover located on the left side of the vehicle body; and
a second foot area formed in the vehicle body cover located on the right side of the vehicle body,
wherein at least one of the foot area includes an opening and a cover, the opening being disposed above at least a component of the power train, and the cover being configured to allow the opening in the foot area to open and close.

23. The straddle type vehicle of claim 22, additionally comprising an elevated pedestal disposed between the foot areas, and a seat disposed atop at least a portion of the elevated pedestal, the opening in said foot area being disposed beside the elevated portion.

24. The straddle type vehicle of claim 22, wherein the cover is detachable from the vehicle body cover.

25. The straddle type vehicle of claim 22, wherein the engine includes a lubricant filler port arranged within the vehicle cover so as to be accessed through the opening when the opened.

* * * * *

UNITED STATES PATENT AND TRADEMARK OFFICE
CERTIFICATE OF CORRECTION

| | | |
|---|---|---|
| PATENT NO. | : 7,374,192 B2 | Page 1 of 1 |
| APPLICATION NO. | : 11/281879 | |
| DATED | : May 20, 2008 | |
| INVENTOR(S) | : Yoshiyasu Mimasa | |

It is certified that error appears in the above-identified patent and that said Letters Patent is hereby corrected as shown below:

On the Title Page, Item (56) (U.S. Patent Documents), Line 5, please delete "180/98.3" and insert -- 180/68.3 --, therefor.

At Column 4, Line 40, after "which" please delete "a", therefor.

At Column 8, Line 21, in Claim 5, before "detachable foot mat" please delete "detachable foot", therefor.

At Column 9, Line 13, in Claim 16, before "detachable foot mat" please delete "detachable foot", therefor.

At Column 9, Lines 14-15, in Claim 16, before "detachable foot mat" please delete "detachable foot", therefor.

At Column 10, Line 32, in Claim 25, before "opened" please delete "the", therefor.

Signed and Sealed this

Sixth Day of January, 2009

JON W. DUDAS
*Director of the United States Patent and Trademark Office*